US 11,449,461 B2

(12) United States Patent
Gonzalez et al.

(10) Patent No.: US 11,449,461 B2
(45) Date of Patent: Sep. 20, 2022

(54) METADATA-DRIVEN DISTRIBUTED DYNAMIC READER AND WRITER

(71) Applicant: VISA INTERNATIONAL SERVICE ASSOCIATION, San Francisco, CA (US)

(72) Inventors: Zandro Luis Gonzalez, Pato Alto, CA (US); Nivetha Thiruverahan, Palo Alto, CA (US); Anurag Solanki, Foster City, CA (US); Ran Xu, Austin, TX (US); Akon Dey, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 178 days.

(21) Appl. No.: 16/717,780

(22) Filed: Dec. 17, 2019

(65) Prior Publication Data

US 2021/0182235 A1 Jun. 17, 2021

(51) Int. Cl.
*G06F 16/13* (2019.01)
*G06F 16/11* (2019.01)
(Continued)

(52) U.S. Cl.
CPC ............ *G06F 16/116* (2019.01); *G06F 16/13* (2019.01); *G06F 40/143* (2020.01); *G06F 40/151* (2020.01); *G06F 40/221* (2020.01)

(58) Field of Classification Search
CPC ...... G06F 16/116; G06F 16/13; G06F 40/143; G06F 40/151; G06F 40/221
See application file for complete search history.

(56) References Cited

U.S. PATENT DOCUMENTS

2001/0039540 A1* 11/2001 Hofmann ................ H04L 61/45
2002/0112224 A1*  8/2002 Cox ........................ G06F 16/86
717/100

(Continued)

FOREIGN PATENT DOCUMENTS

CN   110351315 A  * 10/2019
CN   110868349 A  *  3/2020  ............. H04L 12/66
WO  WO-0146837 A2 *  6/2001  ............. G06F 16/88

OTHER PUBLICATIONS

Dino Esposito; "Manipulate XML Data Easily with Integrated Readers and Writers in the .NET Framework"; Oct. 22, 2019; https://docs.microsoft.com/en-us/archive/msdn-magazine/2003/may/manipulating-XML-data-with-integrated-readers-and-writers-in-net (Year: 2019).*

(Continued)

*Primary Examiner* — Dennis Truong
(74) *Attorney, Agent, or Firm* — Loeb & Loeb LLP

(57) ABSTRACT

A method for receiving text files, each having data defined in various format types. The text files are received without a reference to a schema defining the text files. A description file for each of the text files describing one of the format types is received and the description file includes a separate file from a corresponding text file. Before processing the text file and absent receiving the schema, the method identifies a data structure of the description file, the data structure comprising one or more parameters and definitions of the various format types. Each of the text files is processed and during processing of each of the text files, dynamically generating, at run-time, one or more reader engines to read the data in the text files and dynamically extracting, at run-time, data based on the identified data structure. The method generates an output file with the extracted data.

17 Claims, 6 Drawing Sheets

(51) Int. Cl.
  *G06F 40/143* (2020.01)
  *G06F 40/151* (2020.01)
  *G06F 40/221* (2020.01)

(56) References Cited

U.S. PATENT DOCUMENTS

| | | | | |
|---|---|---|---|---|
| 2002/0143803 | A1* | 10/2002 | Chen | G06F 40/166 |
| | | | | 715/201 |
| 2005/0060313 | A1* | 3/2005 | Naimat | G06Q 30/02 |
| 2005/0097128 | A1* | 5/2005 | Ryan | G06F 16/83 |
| 2005/0097455 | A1* | 5/2005 | Zhou | G06F 40/205 |
| | | | | 715/234 |
| 2006/0036522 | A1* | 2/2006 | Perham | G06Q 40/06 |
| | | | | 705/35 |
| 2006/0206523 | A1* | 9/2006 | Gaurav | G06F 40/143 |
| 2007/0276786 | A1* | 11/2007 | Piedmonte | G06F 16/2453 |
| 2009/0089658 | A1* | 4/2009 | Chiu | G06F 40/205 |
| | | | | 715/234 |
| 2010/0083216 | A1* | 4/2010 | Li | G06F 40/143 |
| | | | | 718/1 |
| 2013/0185251 | A1* | 7/2013 | Garg | G06F 16/86 |
| | | | | 707/602 |
| 2013/0191404 | A1* | 7/2013 | Holmes | G06F 16/2246 |
| | | | | 707/755 |
| 2014/0279834 | A1* | 9/2014 | Tsirogiannis | G06F 16/254 |
| | | | | 707/602 |
| 2017/0075990 | A1* | 3/2017 | Leu | G06F 16/9024 |
| 2017/0235747 | A1* | 8/2017 | Kee | G06F 16/13 |
| | | | | 707/741 |
| 2018/0336072 | A1* | 11/2018 | Guha | G06F 9/52 |

OTHER PUBLICATIONS

A. H. Hmelnov and A. Mikhailov, "Generation of Code for Reading Data from the Declarative File Format Specifications Written in Language FlexT," 2018 Ivannikov Ispras Open Conference (ISPRAS), 2018, pp. 23-30, doi: 10.1109/ISPRAS.2018.00011. (Year: 2018).*

Authors et. al.: Disclosed Anonymously; "Single Log reader for processing database logs in different formats"; IP.com No. IPCOM000238012D; IP.com Electronic Publication Date: Jul. 25, 2014 (Year: 2014).*

M. R. Head and M. Govindaraju, "Parallel Processing of Large-Scale XML-Based Application Documents on Multi-core Architectures with PiXiMaL," 2008 IEEE Fourth International Conference on eScience, 2008, pp. 261-268, doi: 10.1109/eScience.2008.77 (Year: 2008).*

R. Ramachandran, H. Conover, S. Graves and K. Keiser, "Interchange technology for applications to facilitate generic access to heterogenous data formats," IEEE International Geoscience and Remote Sensing Symposium, 2002, pp. 266-268 vol. 1, doi: 10.1109/IGARSS.2002.1025008. (Year: 2002).*

Elias Stehle, Hans-Arno Jacobsen; "ParPaRaw: Massively Parallel Parsing of Delimiter-Separated Raw Data"; https://doi.org/10.48550/arXiv.1905.13415; Apr. 15, 2020 (Year: 2020).*

* cited by examiner

METADATA-DRIVEN DISTRIBUTED DYNAMIC READER AND WRITER

TECHNICAL FIELD

Embodiments discussed herein generally relate to text processing based on metadata.

BACKGROUND

When handling big data processing, one of the biggest challenges have always been identifying and extract data from data sources or files efficiently when the data structure or the schema for the data is not known. For the situations where the schema is known, readers for the schema are done as one-time static application or tool specifically for the particular schema. For example, scalar, map and list are the core data structures as well as the combinations of these three foundational structures. As a result, whenever a new schema is created, a manual process of generating a new reader or writer for the schema is needed.

As data sources used by a data consuming end (e.g., payment processing party) could come from external sources or be created on different platforms leading to several types of text formats. There exists no single general module to handle all types of formats when reading input files in distributed applications. The same problem applies to data sinks/output files. This leads to redundancy in people using one off custom ways to read/write files.

Moreover, within the data consuming ends, there may be various application programs that extract and identify different pieces of data for specific or specialized processing. Each application may have different input record structures to be read from upstream applications. Currently, each developer must hardcode or customize the datatypes and structures corresponding to their input record, because any previously created or used reader or writer engines is not available or capable of other ones. There is no single source/framework to ingest every type of record structure, which leads to redundant one-off efforts with no generalization within the overall processing of these different data types.

Therefore, embodiments attempt to create a technical solution to address the deficiencies of the challenges above.

SUMMARY

Embodiments enable a system for a comprehensive data file consumption/processing based on metadata and the generation of reader engines or write engines at run-time to process large data input from different sources where schemas or data structures defining the data format of the data input are not available.

Alternative embodiments may support data structures created by combinations of these three core data structures (e.g., map, scalar, and list) should be able to support any possible input/output format. The implementation of embodiments supports scalar types but may be easily extended to support map and list types. Moreover, complex combinations of these data structures may also be processed by aspects of embodiments. Even the most complex input formats like Cobol copybooks used may be handled by aspects of embodiments in an optimized distributed manner.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Aspects of embodiments generate a technical solution to create, at run-time, engines that may handle data input files from various sources. Instead of relying on repeated manual efforts to create engines to handle the large incoming data streams, aspects of embodiments create dynamic run time reader and write engines to handle the data given a metadata file. The engines may read data from the data input files based on the metadata file or may write data to an output file based on the metadata file. During the run-time processing, the engines do not have access to any schema or a data structure source that describes the format, data field types, etc., of the data input files. As such, instead of hardcoding reader engines specifically for a certain input from a data source, aspects of embodiments may dynamically handle the data from these types of input files.

Data input processing are known, especially those with predefined or preloaded schemas or data structure. For example, electronic data interchange (EDI) has enabled parties (e.g., sender and receiver) to exchange large amount of data in text format. However, schemas describing the data in these implementations are known, have been pre-loaded or referenced by the data by the parties so that upon receiving the data by the receiver, the receiver can immediately process the received data, whether to build an application or engines to consume or process the data received.

When schema is not available or not known, the receiver may need to provide, in advance, engines such as readers or writers to read or write the data for further processing. These engines are typically hardcoded and are loaded in advance processing. Such arrangement, of course, creates a lot of processing delays, especially when large amount of data may need to be processed.

Figure 1:
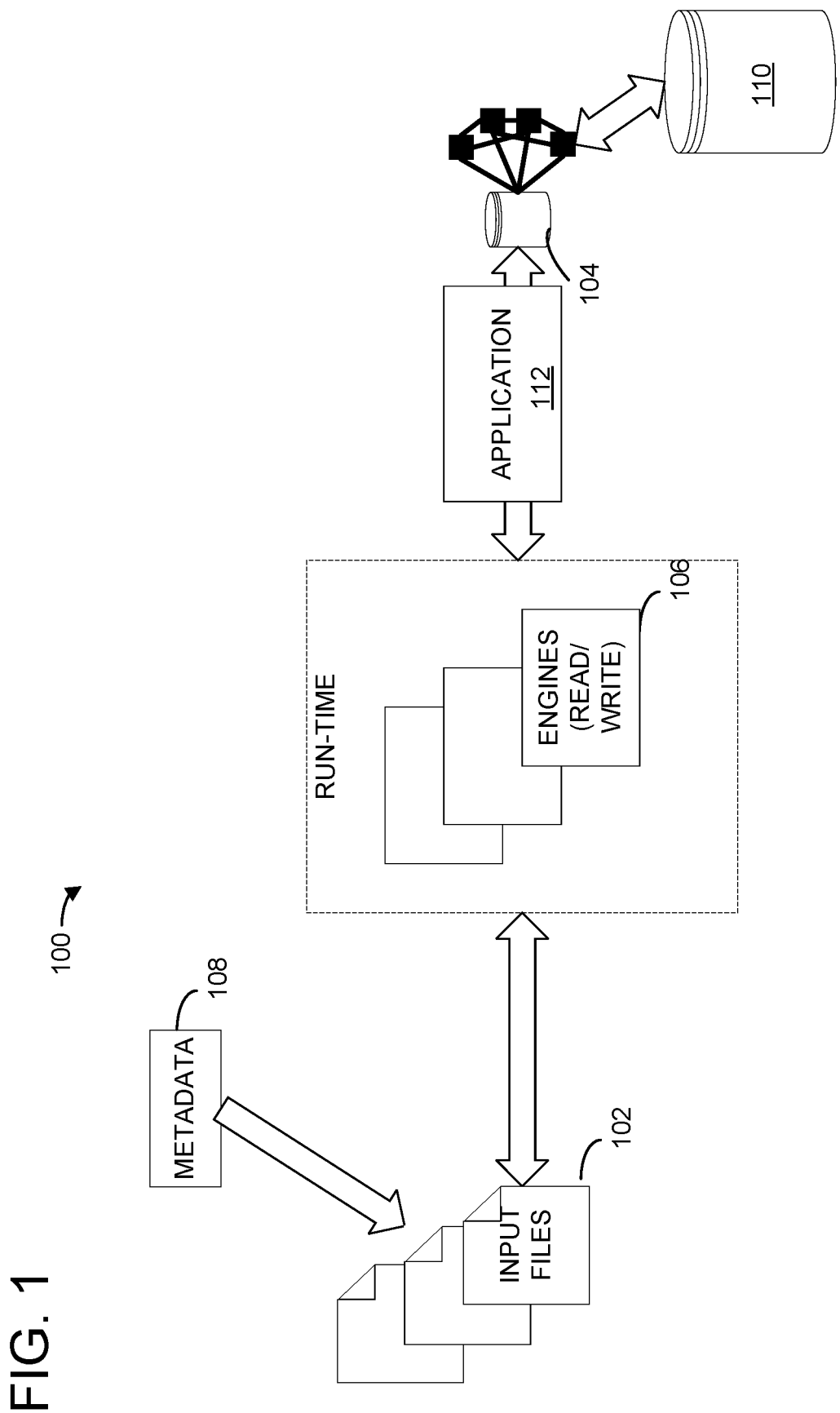
FIG. 1 is a diagram illustrating a system for processing input data without referencing a pre-loaded schema according to one embodiment.

Referring now to FIG. 1, a diagram illustrates a system 100 illustrating aspects of the embodiments for processing input data. In one embodiment, the system 100 may include at least one server 104 for handling input files 102. In one example, the system 100 may be a payment processing system having a payment processing server such as the server 104. The server 104 may be in a distributed manner such that the server 104 may be organized in a cluster and may be distributed in different geographical regions.

In one embodiment, the server 104 may also execute or "run" one or more applications 112 that further expand the capabilities of the server 104. For example, as data is received, there may be different layers of applications 112 that perform functions on the data. In addition, these applications are mostly installed ab initio on the server 104 so that the processing and execution of the application 112 is more efficient and faster.

The server 104 may also be connected via a network connection with a database 110. For example, the database 110 may store data and supplemental data, such as helper files, etc., to assist the server 104 for processing the input files 102. In another embodiment, the database 110 may store the applications 112 that the server 104 may process or execute.

Figure 6:
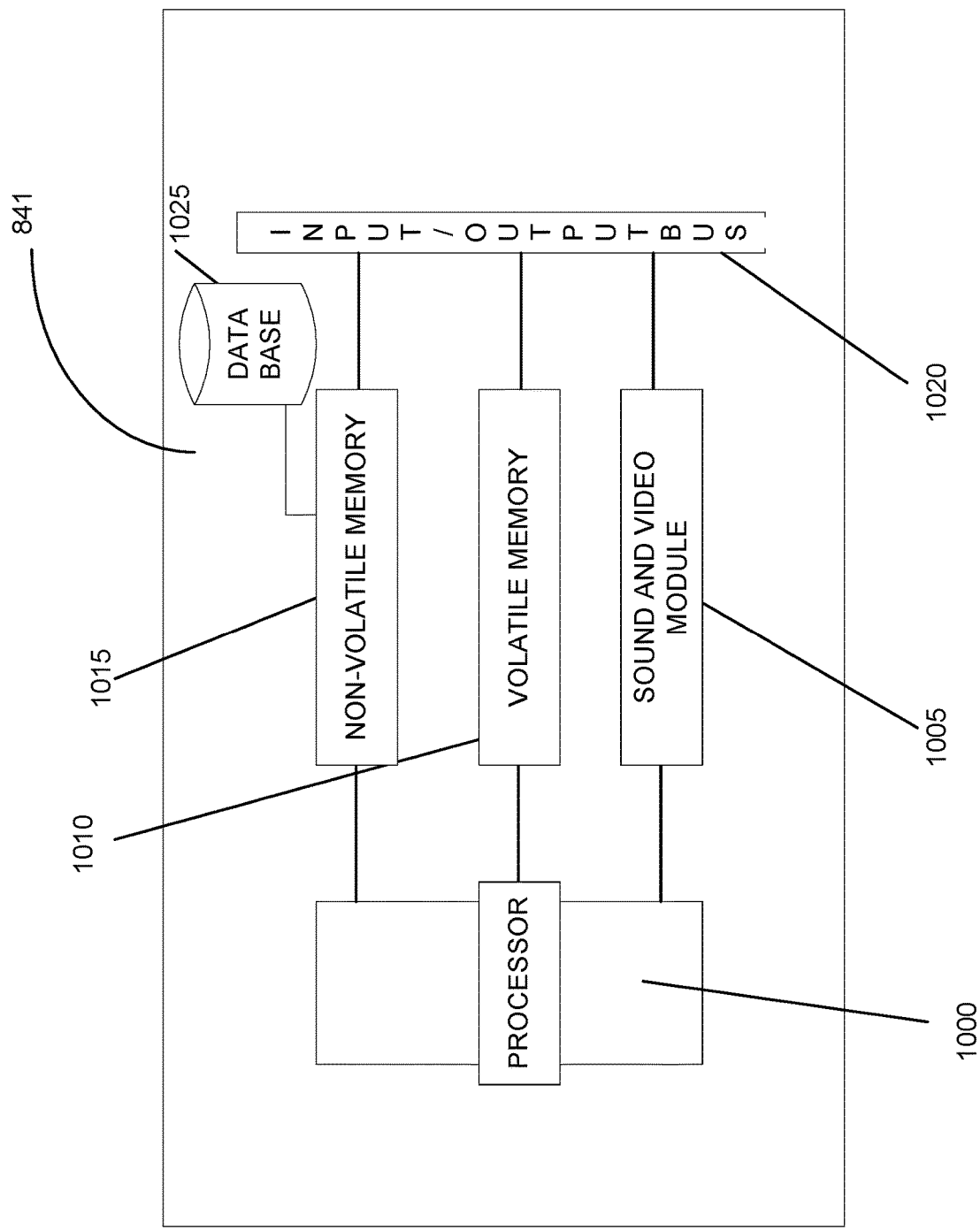
FIG. 6 is a diagram illustrating a computing device according to one embodiment.

Moreover, the database 110 may include random access or volatile memory 1010 in FIG. 6 for storage needs during run-time processing.

In a further embodiment, the system 100 may receive input files 102 from a number of data sources. For example, as discussed above, in one embodiment, the server 104 may be a server for a payment processing entity. Therefore, the server 104 may handle payment transactions from different sources such as merchants (e.g., both online and offline), acquirers, and issuers. While most of these have prior relationships with the payment processing entity to process payments. However, sometimes the data source may not have prior relationship or that the information about the data files is being updated. In another example, the input file from the data source may be new and the server 104 may not have updated its file handling data structure or schema yet.

In yet another embodiment, even if the server 104 may have the schema and/or the applications 112 installed or stored to process the input files 102, there may be special processing program or scripts that are hardcoded. These hardcoded scripts or programs not only need to pre-loaded to the server 104 before the input files 102 are received, but they also need to be current. If the input files 102 have been updated, the scripts are rendered obsolete or need to be updated and compiled manually. This may be burdensome to the server 104, especially when the input files 102 are large (e.g., more than hundreds of MB or GB in size) and the files 102 may need to be processed timely.

Hence, aspects of the embodiments attempt to solve or alleviate the shortcomings but dynamically generating, at run-time, reader and writer engines.

Figure 2:
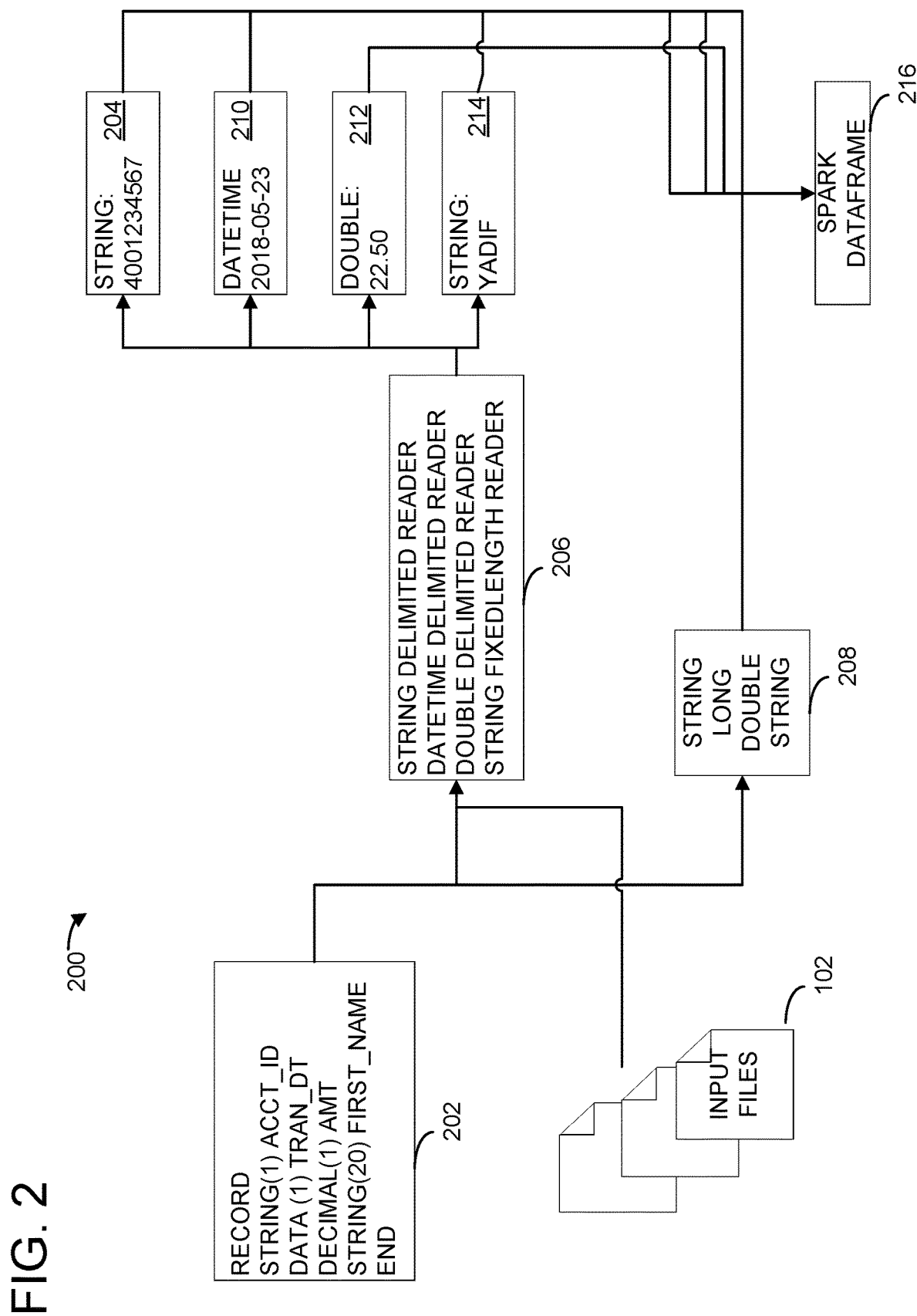
FIG. 2 is a diagram illustrating a reader according to one embodiment.
Figure 3:
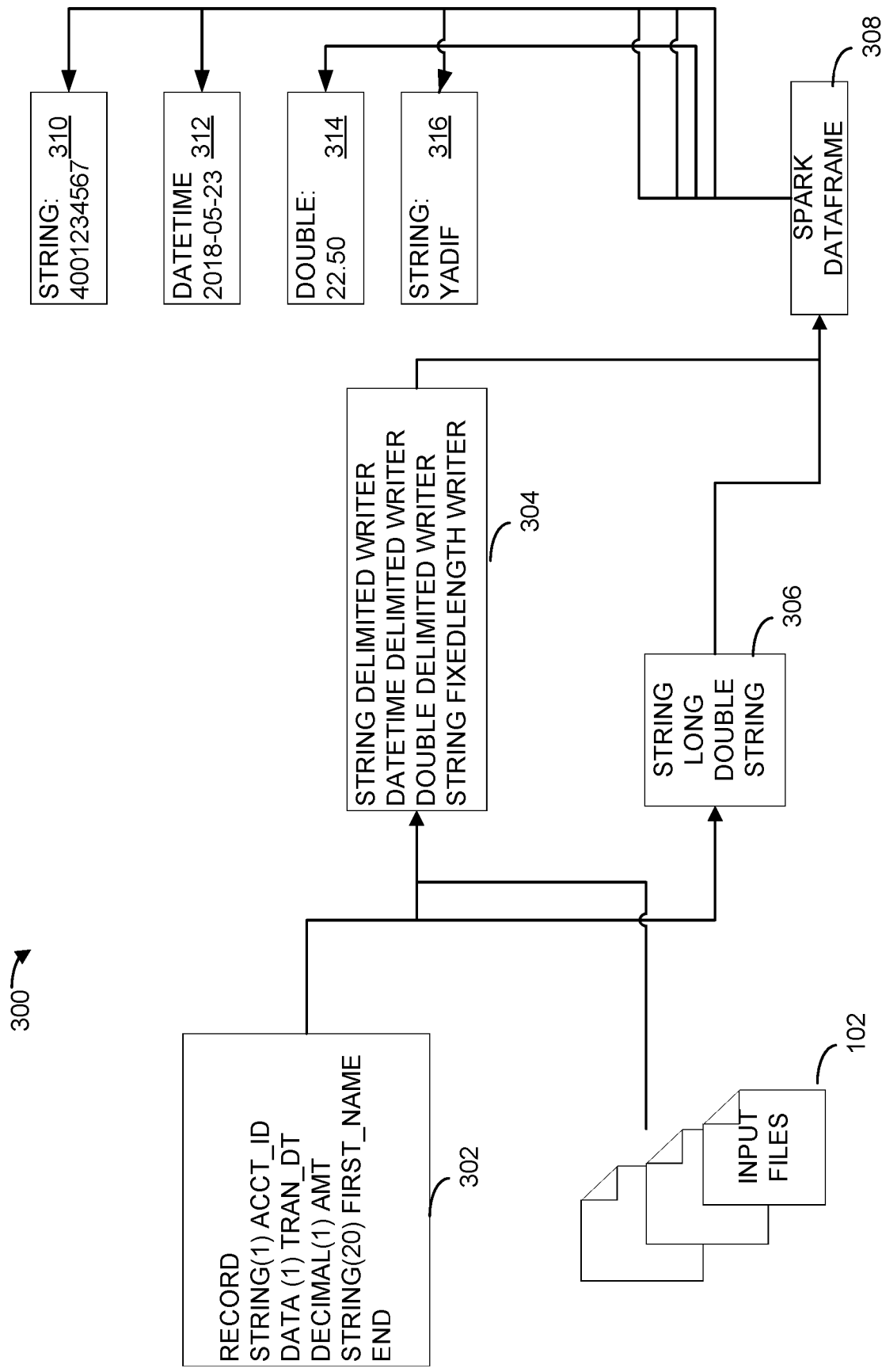
FIG. 3 is a diagram illustrating a writer according to one embodiment.

Referring to FIGS. 2 and 3, system diagrams illustrate two aspects of embodiments. In one embodiment, as the input files 102 are received or retrieved by the server 104, a description file 202 may be provided. In one embodiment, the description file 202 may be in a XML format. In another embodiment, the description file 202 may be a metadata-based file where it describes one or more data format of data included in the input files 102. For example, the description file 202 may include the following:

```
<records>
<attributes>
    <attribute>
    <name>Acct_id</name>
    <datatype>String</datatype>
    <delimiter>|</delimiter>
...
    <properties>
        <length>
        <name> LENGTH</name>
        <value>20</value>
    </properties>
    </attribute>
</record>
```

In other words, the description file 202 may be written in a structured document such as XML, and the contents of the description file 202 may be related to the input files 102, such as name, properties of the length, etc. It is also to be understood that other structured or declaratory language may be used without departing from the spirit and scope of the embodiments.

Referring back to FIG. 2, in a subsystem 200 where a set of dynamically generated engines is created, the server 104 may receive the description file 202 along with the input files 102 when processing the input files 202. In another embodiment, the description file 202 may be received substantially simultaneously as the input files 102. In another embodiment, the description file 202 may be generated by a third party. In yet another embodiment, the description file 202 may be generated by developers of the system 100 for the purpose of describing the input files 102.

Once received, the server 104 may generate, at run-time, dynamic processing engines. In one embodiment, the processing engines may be reader engines and writer engines.

Referring to FIG. 2 again, the server 104 may first dynamically generate readers based on the description file 202. For example, when metadata is provided in XML format, a parser may first parse the metadata and generate appropriate readers and writers.

For example, input and Output file components may have predefined list of readers and writers respectively for different common data types. Even complex data structures combining simple data structures such as hierarchal records/list/unions may be handled with this approach and it may generate hierarchal set/list of readers and writers to read/write records in parallel across clusters. This generation module may override and modify input and output format libraries in platforms such as Spark and works on top of file system such as Hadoop File System.

For example, in FIG. 2, a list of reader may be generated in 206:
String delimited reader;
Datetime delimited reader;
Double delimited reader; and
String fixedlength reader.

In one embodiment, while the description file 202 includes two types of "string" data format (e.g., "string(1) acct_id" and "string(20) first_name"), instead of just one string type reader, embodiments may generate two reader engines due to the difference in the data format type. This may be relevant because recognizing the specific data and its corresponding data format type may be needed to ensure that the accurate data information is extracted and processed.

Similarly, during the dynamic generation of the reader engine process, the reader engine may extract or identify the corresponding structure of the fields from the input files 102. In this example, the extracted data 208 may identify "string," "long," "double," and "string" from the input files 102.

Moreover, the actual data may be read or provided. For example, a field 204 may store a string value based on the "string delimited reader;" a field 210 may store a date value based on the "datetime delimited reader;" a field 212 may store a double value based on the "double delimited reader;" and a field 214 may store a fixed string length value based on the 'string fixedlength reader."

With the extracted data (e.g., fields 204 and 210 through 214) and the structure 208 identified, the system 100 may further provide the information to a dataframe for a platform such as Spark. In one example, such processing may be part of the payment processing system. It is of course understood that the platform may vary and may be customized without departing from the spirit and scope of the embodiments.

In another example, exemplary reader (and writer) engines may include the following:
string delimited datatype→StringDelimitedReader, StringDelimitedWriter
string fixed length datatype→StringFixedLengthReader, StringFixedLengthWriter
integer delimited datatype→IntegerDelimitedReader, IntegerDelimitedWriter
integer fixed length datatype→IntegerFixedLengthReader, IntegerFixedLengthWriter
decimal delimited datatype→DoubleDelimitedReader, DoubleDelimitedWriter
decimal fixed length datatype→DoubleFixedLengthReader, DoubleFixedLengthWriter
datetime delimited datatype→DatetimeDelimitedReader, DatetimeDelimitedWriter
datetime fixed length datatype→DatetimeFixedLengthReader, DatetimeFixedLengthWriter In one embodiment, dynamically generated readers, and extracted structure of data may be used to produce dataframes from the text of a file, with said structure. Conversely, dynamically generated writer may use the structure to construct text from a dataframe that are then written to a file.

Referring now to FIG. 3, a subsystem 300 in the dynamic generation of engines may include a set of writer engines 304 that is dynamically generated is provided. For example, instead of the reader engine, the writer engines 304 may obtain the read information (e.g., structure of the fields from the input files 102 and the description file 302, the reader engine may extract the structure of the fields at 306. Once extracted, combining processing specification with the platform such as Spark dataframe 308, fields 310 through 316 with the mapped data may be written to an output file.

In another embodiment, when data is huge and distributed across multiple splits in Hadoop distributed file system (HDFS), it may be difficult to determine whether the logical record has the same boundary as a physical record split. In one embodiment, it may be possible that a split has a record starting from position n (0>n>l) where l is record length. As such, the system may never know record that is trying to read is somewhere in the middle of the record. The lack of knowledge may increase the complexity to determine a single solution for big data systems. Aspects of embodiments may have solved this complexity by taking into account the block size and using specialized logic for delimited/fixed length data to determine the correct starting position of a logical record in a physical split.

In yet another embodiment, aspects of embodiments attempt to resolve issues relating to a split as described above. To further illustrate this feature and the implementations, a HDFS may be used. For example, each partition of data in Hadoop file system is processed by one executor and all available executors run in parallel. Each partition has a variable "splitStart" available to it that is the byte from which it begins processing the read operation (this is cumulatively calculated from the first partition).

With such an example:
splitStart for first partition of data is always 0.
The first partition may accommodate 3000 bytes in terms of a physical chunk size. Second partition's splitStart may be 3000, and so on for succeeding partitions.

A logical record may be split across two or more physical partitions due to the difference in logical record size and physical chunk size. Hadoop gives the capability for an executor to fetch beyond the last byte of a partition it is processing, if needed, to ensure completeness of a logical record. However it may not provide the automatic capability for an executor to realize that the pointer pointed to the first byte of the partition may be the middle of a logical record which the previous partition's executor would anyway process.

So, to ensure correctness in the number and format of records read, aspects of embodiments build the algorithmic capability to move the splitStart pointer to the accurate beginning of the first logical record, within the partition to be processed by an individual executor.

In one illustration, the metadata for the input schema is processed to infer one of the two cases: FULLY_FIXED_LENGTH or DELIMITED_WITH_UNIQUE_RECORD_SEPARATOR A fully fixed length formatted record is one where each field is defined in terms of a particular length and is categorized as FULLY_FIXED_LENGTH.

Any other arbitrary combination of fixed length and delimited fields is categorized as DELIMITED_WITH_UNIQUE_RECORD_SEPARATOR, and we enforce that a unique character/combination of characters is used as a record separator, in comparison to field separators in the middle of the record.

In yet another embodiment, from a single executor's perspective let c_par be the current partition being processed at a time and p_par be the immediately previous partition processed by another executor:
In case of FULLY_FIXED_LENGTH:
The spliStart value and recordSize (sum of all fixed length field lengths) may be taken into account. The number of full logical records that may be present in all partitions before c_par are (splitStart of c_par/recordSize). Therefore the remainder (splitStart of c_par % recordSize) may be the number of bytes of a logical record that has already started in p_par. The number of bytes of this particular logical record present in c_par, and therefore the number of bytes to be skipped in c_par is skip=recordSize−(splitStart of c_par % recordSize). The splitStart may be moved for c_par by skip.

In case of DELIMITED_WITH_UNIQUE_RECORD_SEPARATOR:

The splitStart value and recordSeparator may be taken into account. For example, within character parsing (e.g., c_par polling of characters) starting from the first byte of the partition may be done in order to match the sequence of characters represented by recordSeparator. If a match is found, all the bytes up to the recordSeparator may be skipped as they may be processed by the executor working on p_par. Therefore skip=(startPos of matching sequence+length of recordSeparator). The splitStart may be moved for c_par by skip.

This skip operation may be done across all executors as they process a new partition of data, except for the first partition.

Figure 4:
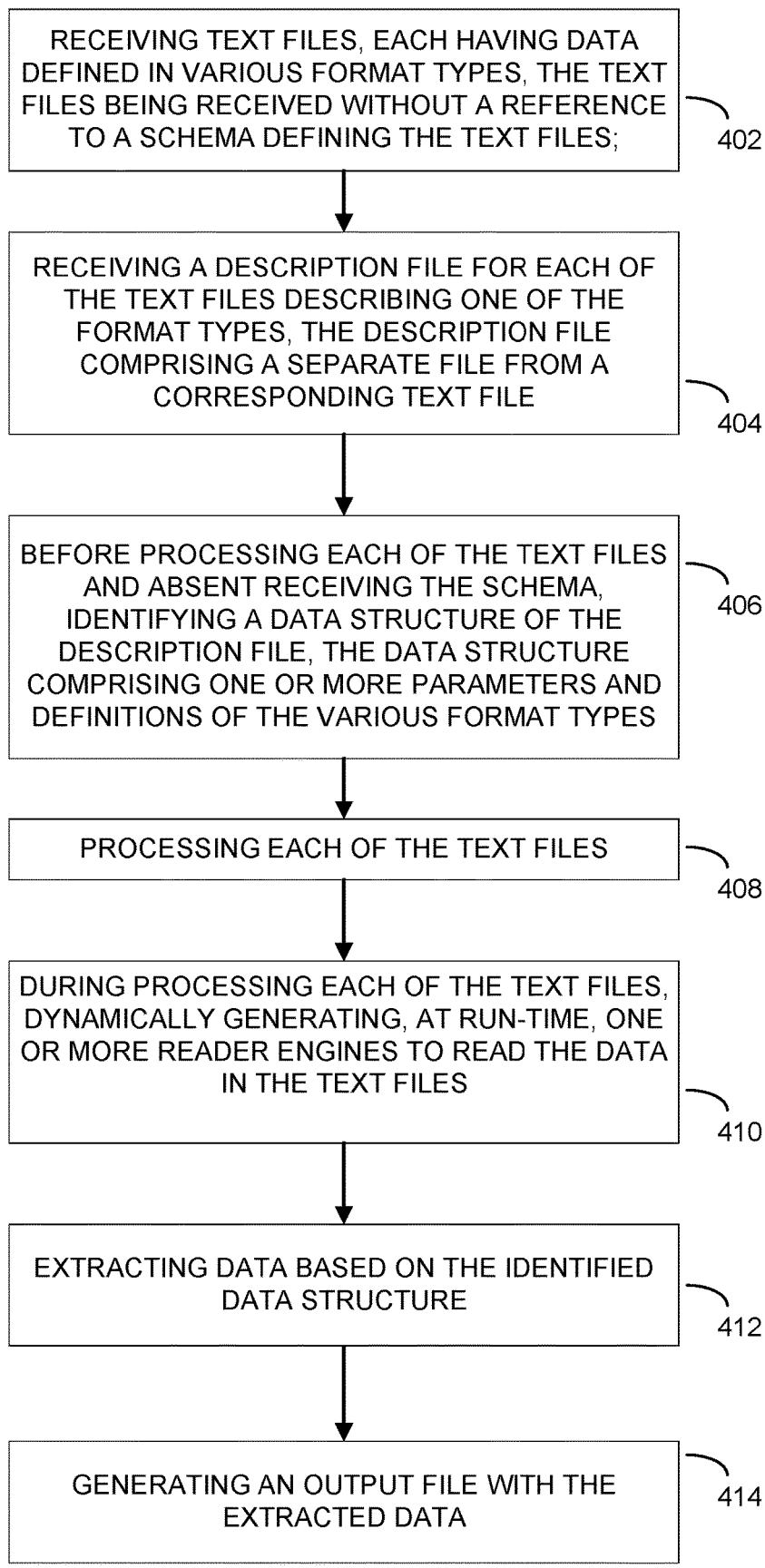
FIG. 4 is a flow diagram illustrating a computer-implemented method for a delayed according to one embodiment.

Referring now to FIG. 4, a flow diagram illustrates a method according to one embodiment. At 402, in one embodiment, the system 100 may receive text files, each having data defined in various format types. The text files may be received without a reference to a schema defining the text files. At 404, a description file 202 or 302 may be received for each of the text files describing one of the format types. The description file may be a separate file from a corresponding text file. In one embodiment, the description file may be in an XML format. At 406, before processing each of the text files and absent receiving the schema, the server 104 may identify a data structure of the description file. The data structure may include one or more parameters and definitions of the various format types.

In another embodiment, at 408, the server 104 may process each of the text files 102 and, during processing each of the text files, dynamically generating, at run-time, one or more reader engines to read the data in the text files at 410. At run-time, the server 104 may further execute the generated dynamically engines to extract data based on the identified data structure at 412. At 414, the server 104 may generate an output file with the extracted data.

Figure 5:
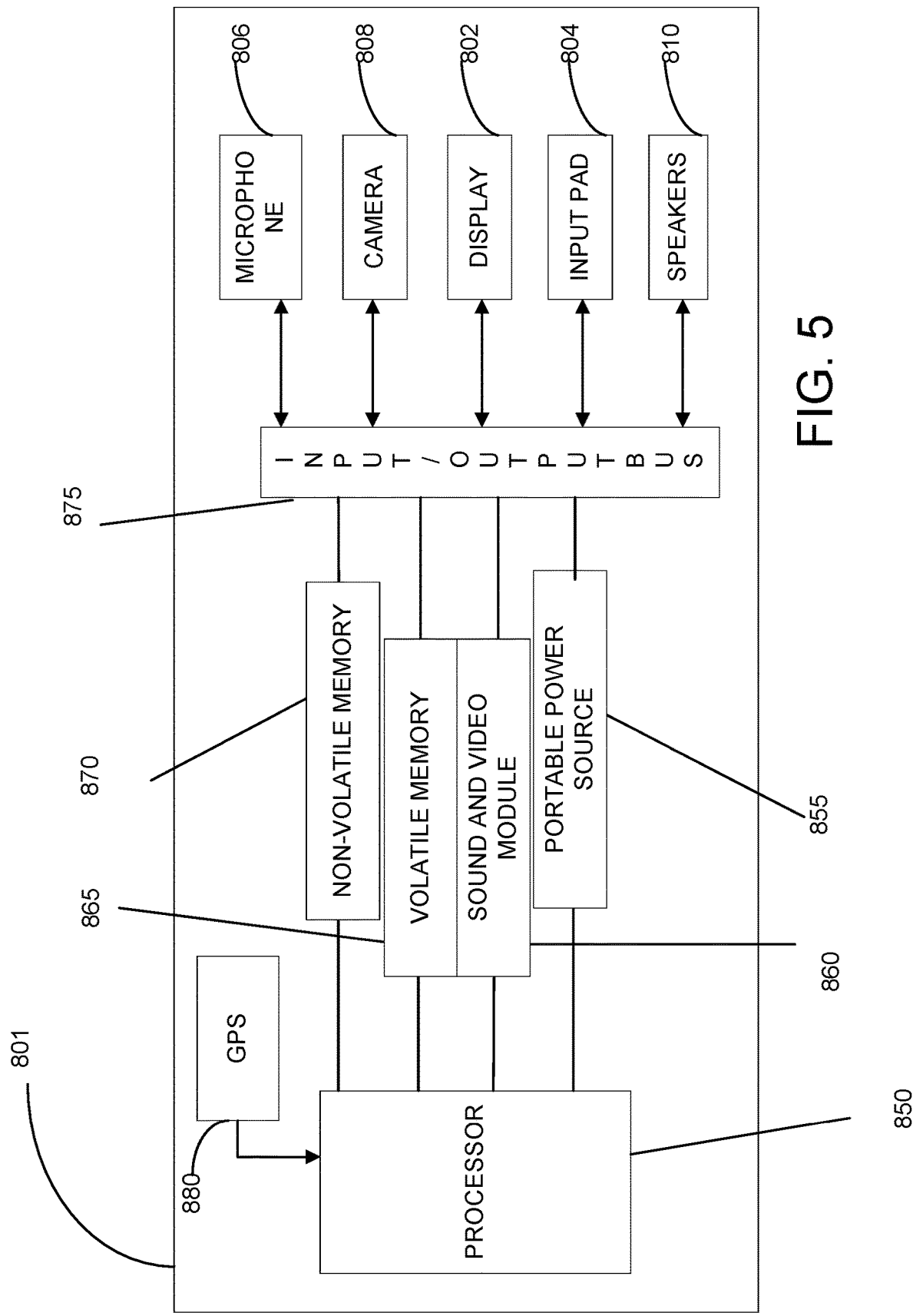
FIG. 5 is a diagram illustrating a portable computing device according to one embodiment.

FIG. 5 may be a high level illustration of a portable computing device 801 communicating with a remote computing device 841 in FIG. 6 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 841. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 5 may be a simplified illustration of the physical elements that make up a portable computing device 801 and FIG. 6 may be a simplified illustration of the physical elements that make up a server type computing device 841.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods for handling large amount of input data files where the data structure or schema is not provided. Rather, only a metadata description file of the input files is provided. Embodiments may then apply the description file to dynamically generate, at run-time, necessary reader or writer engines to process the data within the input files. Hardcoded files/scripts may no longer be needed to be preloaded to the system before processing the input files.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
receiving at least two text files, each having data defined in two different format types, the at least two text files being received without a reference to a schema defining the at least two text files, wherein one of the at least two different format types is not an eXtensible Markup Language (XML) format;
receiving a description file for each of the at least two text files describing each of the at least two different format types, the description file comprising a separate file from a corresponding text file;
before processing each of the at least two text files and absent receiving the schema, identifying a data structure of the description file, the data structure comprising one or more parameters and definitions for one of the at least two different format types;
dynamically generating, at run-time, at least two reader engines corresponding to each of the at least two text files to process the description file for each of the at least two text files based on the identified data structures, wherein each of the at least two reader engines read the data in each of the at least two text files in parallel processing;
processing each of the at least two text files as a function of one of the dynamically generated at least two reader engines;
during processing of each of the at least two text files:
dynamically extracting, at run-time, by one of the at least two reader engines from each of the at least two text files, data based on the identified data structure; and
generating one or more output files with the extracted data.

2. The computer-implemented method of claim 1, wherein the description file comprises metadata.

3. The computer-implemented method of claim 2, wherein the description file for one of the two different format types comprises a file in an eXtensible Markup Language (XML) format.

4. The computer-implemented method of claim 1, wherein the one or more output files comprise a dataframe, the dataframe comprising a 2-dimensional labeled data structure with columns of potentially different types.

5. The computer-implemented method of claim 1, further comprising dynamically generating, at run-time, one or more writer engines to write the dataframe to a string format file.

6. A computer-implemented method comprising:
receiving at least two text files, each having data defined in two different format types, the at least two text files being received without a reference to a data format structure that defines the at least two text files, wherein one of the at least two different format types is not an eXtensible Markup Language (XML) format;
receiving a description file for each of the at least two text files describing each of the at least two different format types, the description file comprising a separate file from a corresponding text file;
before processing each of the at least two text files and absent receiving the data format structure, identifying a data structure of the description file, the data structure comprising one or more parameters and definitions for one of the at least two different format types;
dynamically generating, at run-time, at least two reader engines corresponding to each of the at least two text files to process the description file for each of the at least two text files based on the identified data structure, wherein each of the at least two reader engines read the data in each of the at least two text files in parallel processing;
processing each of the at least two text files as a function of one of the dynamically generated at least two reader engines;
during processing of each of the at least two text files:
dynamically extracting, at run-time, by one of the at least two reader engines from each of the at least two text files, data based on the identified data structure; and
generating one or more output files with the extracted data.

7. The computer-implemented method of claim 6, wherein the at least two reader engines read the data in the text files.

8. The computer-implemented method of claim 6, wherein the description file comprises metadata.

9. The computer-implemented method of claim 8, wherein the description file for one of the two different format types comprises a file in an eXtensible Markup Language (XML) format.

10. The computer-implemented method of claim 6, wherein the one or more output files comprise a dataframe, the dataframe comprising a 2-dimensional labeled data structure with columns of potentially different types.

11. The computer-implemented method of claim 10, wherein dynamic generating comprises dynamically generating, at run-time, one or more writer engines to write the dataframe to a string format file.

12. A system comprising:
a memory for storing at least two text files;
a processor configured for executing computer-executable instructions for:
accessing the at least two text files in the memory, each having data defined in one of at least two different format types, the at least two text files lacking a reference to a data format structure that defines the text files, wherein one of the at least two different format types is not an eXtensible Markup Language (XML) format;
receiving a description file for each of the at least two text files describing one of the at least two different format types, the description file comprising a separate file from a corresponding text file;
before processing each of the at least two text files and absent receiving the data format structure, identifying a data structure of the description file, the data structure comprising one or more parameters and definitions for the at least two different format types;
dynamically generating, at run-time, at least two reader engines corresponding to each of the at least two text files to process the description file for each of the at least two text files based on the identified data structure, wherein each of the at least two reader engines read the data in each of the at least two text files in parallel processing;
processing each of the at least two text files as a function of one of the dynamically generated at least two reader engines;
during processing of each of the at least two text files:
dynamically extracting, at run-time, by one of the at least two reader engines from each of the at least two text files, data based on the identified data structure; and
generating one or more output files with the extracted data.

13. The system of claim 12, wherein the at least two reader engines read the data in the text files.

14. The system of claim 12, wherein the description file comprises metadata.

15. The system of claim 14, wherein the description file comprises a file for one of the two different format types comprises a file in an eXtensible Markup Language (XML) format.

16. The system of claim 12, wherein the one or more output files comprises a dataframe, the dataframe comprising a 2-dimensional labeled data structure with columns of potentially different types.

17. The system of claim 16, wherein one or more writer engines are dynamically generated at run-time to write the dataframe to a string format file.

\* \* \* \* \*